Oct. 1, 1963  W. COHEN  3,105,592
TELESCOPIC FORM CONTAINERS AND DISPENSERS
Filed May 18, 1961  3 Sheets-Sheet 1

INVENTOR.
WILLIAM COHEN
BY
Zoltan Holecheck
ATTORNEY

INVENTOR.
WILLIAM COHEN
BY
ATTORNEY

Oct. 1, 1963   W. COHEN   3,105,592
TELESCOPIC FORM CONTAINERS AND DISPENSERS
Filed May 18, 1961   3 Sheets-Sheet 3

INVENTOR.
WILLIAM COHEN
BY
ATTORNEY

United States Patent Office 3,105,592
Patented Oct. 1, 1963

3,105,592
TELESCOPIC FORM CONTAINERS AND DISPENSERS
William Cohen, 2165 Ryer Ave., New York, N.Y.
Filed May 18, 1961, Ser. No. 111,896
1 Claim. (Cl. 206—56)

This invention relates generally to containers and more particularly to adjustable sectional and telescopic containers.

The invention broadly comprises a sectional container, the sections of which are telescopically arranged, the sections being provided with an inlet to receive the contents and with an outlet for discharging the contents, the size of the space for the contents automatically increasing and decreasing as the contents is added or removed. The container may take various shapes and forms for holding and dispensing contents of various shapes and forms.

The invention contemplates providing a sectional container for holding and dispensing coins, tokens, mints, pills, powdered products, vitamins, cigarettes and other objects usually carried in the pockets, or pocket books but may hold and dispense other items.

According to a modification of the invention a perforated sectional container is provided for holding a fumigant and the like, which container serves as a pole for supporting clothes, and is particularly suitable for use in clothes closets.

It is accordingly a principal object of the present invention to provide a sectional container having an inlet and an outlet, the sections being telescopic for adjusting the size of the space for the contents.

Another object of the inveniton is to provide a sectional and telescopic container with means for guiding the movement of the sections.

A further object of the invention is to provide a container of this kind that is simple in construction, economical to manufacture and highly efficient in operation.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

Figure 1:
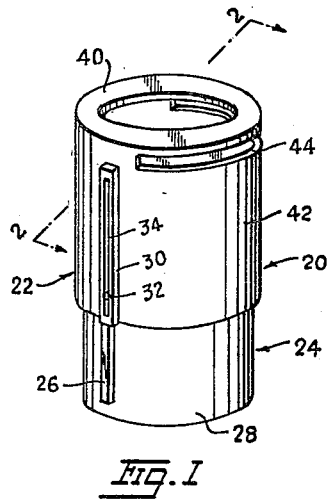
FIG. 1 is a perspective view of a sectional container and dispenser embodying one form of my invention.
Figure 2:
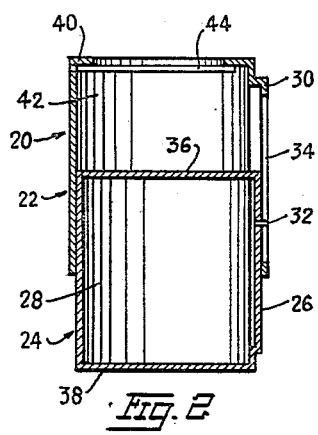
FIG. 2 is a vertical sectional view taken on the line 2—2 of FIG. 1.
Figure 3:
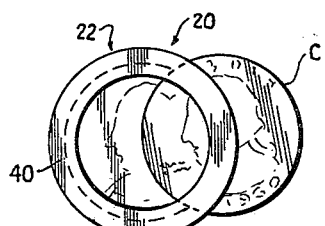
FIG. 3 is a top plan view of the container of FIG. 1, on a reduced scale, a coin being shown partly dispensed.

Referring in detail to the drawings, and particularly to FIGS. 1 to 3, inclusive, a sectional container is shown and designated generally by the reference numeral 20. The container 20 has a hollow cylindrical body formed of metal, plastic or any suitable material. The body is composed of an outer section 22 round in cross section and an inner section 24 of similar shape. The inner section is smaller in diameter than the outer section to permit relative sliding movement between the sections. An elongated rail 26, rectangular in cross section is formed integrally with the outer surface of the side wall 28 of the inner section, extending from a point adjacent the inner end thereof to a point closely spaced from the outer end thereof. The outer section 22 is integrally formed with a rail 30 of substantially similar shape and length but is channeled to slidably receive the rail 26 on the inner section. A pin 32 carried by the rail 26 extends through a slot 34 in the rail 30 to guide the sections in sliding movement.

In accordance with the invention, the inner section 24 has a top wall 36 and bottom wall 38. The outer section 22 is open at the bottom to receive the inner section and is formed with an inwardly extending flange or rim 40 at its top or outer end to narrow the opening at the top. The side wall 42 of the outer section is formed with a semi-annular slot 44 closely spaced downwardly from the rim 40.

In using the container 20, flat circular objects such as coins are inserted through the slot 44 and drop down onto the top wall 36 of the inner section which serves as a floor or platform for the coins. When the coins are stacked on this floor, the rim 40 of the outer section rests upon the uppermost coin C which is in line with the slot 44. The weight of the outer section prevents any rattling of the coins and they are never loose enough to fall out, although they may be easily slipped out through slot 44, one by one, by outward finger pressure thereon, as shown in FIG. 3.

The modified form of container 20' shown in FIGS. 4 to 7, inclusive, differs from the container 20 in that the outer and inner body sections 22' and 24' respectively, are rectangular in cross section instead of being round. Furthermore, in place of a rim 40 on the outer end of the outer section 22' a separate plastic sifter cover 46 is provided. The inner section 24' has no top wall.

The cover 46 comprises a rectangular shaped plate-like body 48 with a flange 50 around its periphery disposed at right angles thereto, one end of the flange terminating in an inwardly extending flange 52 therearound. The flanges 50 and 52 and plate 48 define an inner groove 54 around the cover.

A V-shaped opening 56 is formed in the plate-like body 48 to one side of its center and a series of spaced holes 58 are formed in the side of the body 48 adjacent one end thereof. A closure plate 60 approximately one-half the size of the cover body 48 slides on the cover body 48, the edge walls of the groove 54 serving as guides. The closure plate is provided with a finger piece 64 to manipulate the same. The closure plate is adapted to be slid over the opening 56 and the holes 58 to close the same. The cover 46 is readily and detachably secured on the open top or outer end of the outer section 22' by means of opposed metal clamps 66 secured to the flanges 50 of the cover by rivets 68 and depending therefrom for clamping engagement with the side wall 42' of the outer section 22'.

In using the container 20', the cover 46 is removed and the contents such as powdered substance is poured into the outer section 22' on to the bottom wall 38' of the inner section 24'. The cover is replaced and the contents dispensed out through either the opening 56 or the holes 58, the closure plate 60 controlling the dispensation of the contents.

Figure 8:
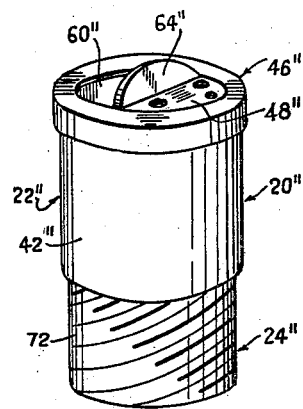
FIG. 8 is a perspective view of a sectional container embodying still another modified form of the invention.
Figure 5:
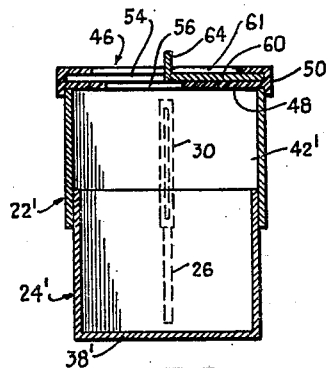
FIG. 5 is a vertical sectional view taken on the line 5—5 of FIG. 4.
Figure 9:
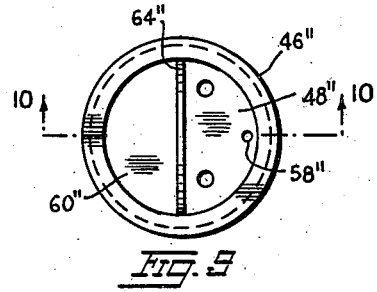
FIG. 9 is a top plan view thereof.
Figure 6:
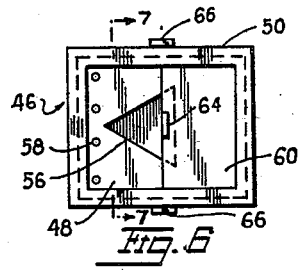
FIG. 6 is a top plan view thereof.
Figure 10:
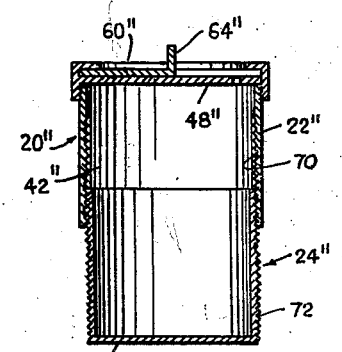
FIG. 10 is a sectional view taken on the line 10—10 of FIG. 9.
Figure 7:
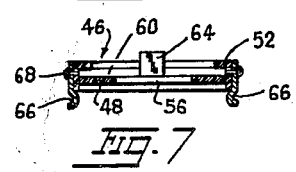
FIG. 7 is a sectional view taken on the line 7—7 of FIG. 6.

The modified form of container 20'' shown in FIGS. 8 to 10, inclusive differs from the form of container 20' shown in FIGS. 4 to 7, inclusive, in that the outer section 22'' and the inner section 24'' are round in cross section instead of rectangular, and the outer section 22'' is threaded on the inner surface 70 of its side wall 42'' and the inner section 24'' is threaded on its outer surface 72 to mesh with the threads on the inner surface of the outer section. The inner section 24'' has no top wall such as the wall 36.

Furthermore, the plate-like body 48'' of the cover 46'' is formed with spaced holes 58'' only. The slidable closure plate 60'' is formed with a handle 64'' extending the width of the plate-like body.

Both the outer section 22'' and the inner section 24'' are adapted to hold powdered or similar substance and the container 20'' is used by turning the outer section 22'' around the inner section 24'' whereby the contents sifts through the holes 58'' in the cover. The holes may be closed by the sliding closure plate 60'' as will be understood. In all other respects, the form of container 20'' is similar to the form of container 20 and similar reference numerals are used to indicate similar parts.

Figure 11:
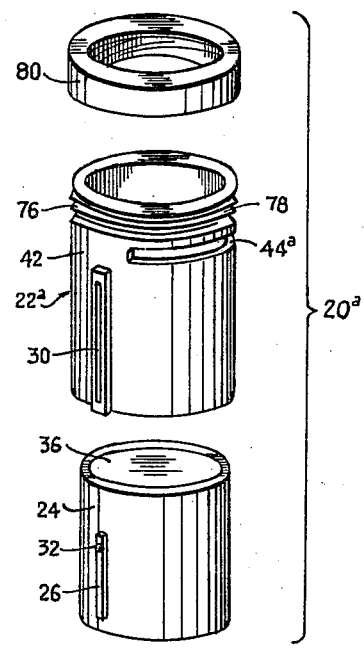
FIG. 11 is a perspective disassembled view of a container embodying a still further modified form of the invention.
Figure 12:
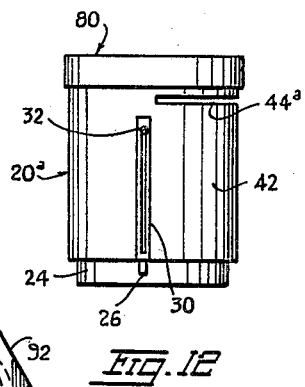
FIG. 12 is a side elevational view thereof.

The modified form of container 20ª shown in FIGS. 11 and 12 differs merely from the form of container 20 in that the top or outer end of the outer section 22ª is extended as indicated at 76 and is externally screw threaded as indicated at 78 to receive an internally screw threaded cap or cover 80. The cap is secured on the threaded top end of the outer section 22ª above the slot 44ª.

Figure 14:
FIG. 14 is a perspective view of a cap used with the container of FIG. 13.
Figure 13:
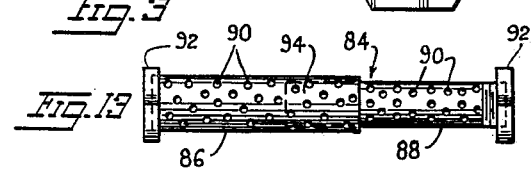
FIG. 13 is a front view of a container embodying a still further modified form of the invention.
Figure 4:
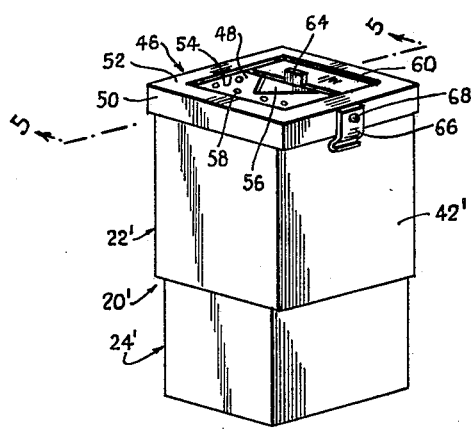
FIG. 4 is a perspective view of a sectional container embodying a modified form of my invention.

Referring now to the modification of the invention shown in FIGS. 13 and 14, herein an elongated hollow sectional container 84 is shown including an outer section 86 and an inner section 88 telescoped within the outer section. The sections are formed with a plurality of perforations 90. The telescoped sections are open at both ends and both ends are externally screw threaded to receive internally screw threaded metal caps 92 for closing the ends. A plug 94 of fumigant material is inserted through one end of the body of the container before the cap is threaded thereon.

The fumes of the fumigant material pass out through the perforations 90 in the container to the outside thereof. The body of the container is elongated and round in cross-section so that it is adapted to support an article of clothing thereon. The container 84 is especially useful in clothes closets for holding moth balls, crystals and the like.

Figure 15:
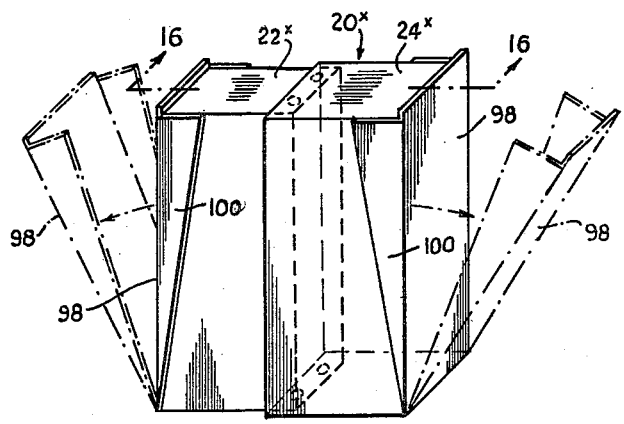
FIG. 15 is a perspective view of a sectional container and dispenser embodying yet another modified form of the invention, showing the closure members in open position in dot-dash lines.
Figure 18:
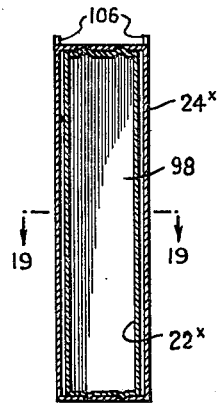
FIG. 18 is a vertical sectional view taken on the line 18—18 of FIG. 16.
Figure 16:
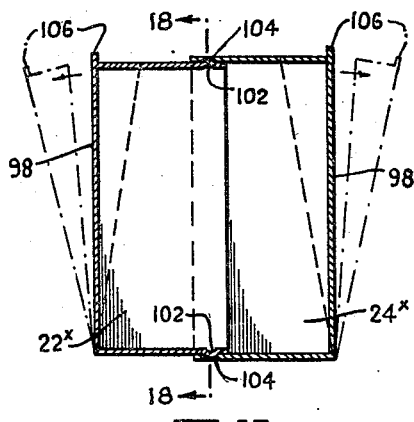
FIG. 16 is a sectional view taken on the line 16—16 of FIG. 15.

Referring now to the modification shown in FIGS. 15 to 19, inclusive, herein the sectional container 20ˣ has a rectangular shaped body composed of a pair of telescoped boxlike tubular body sections 22ˣ and 24ˣ. Section 22ˣ is slightly smaller than section 24ˣ and is slidable thereinto. Both sections are closed and sealed at their outer sides by side walls 98 hingedly and integrally connected to the bottom outer ends as viewed in FIG. 15 and provided with triangular shaped side wings 100. Section 22ˣ is formed with pairs of teats 102 on its ends adjacent the inner open side thereof and section 24ˣ is formed with pairs of complementary indentures 104 to receive the teats for holding the sections in spread apart condition as shown in FIGS. 15 and 16.

Figure 17:
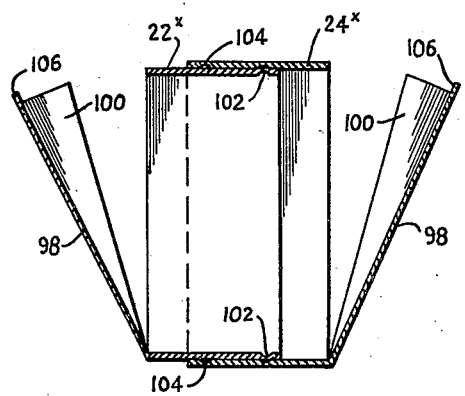
FIG. 17 is a view similar to FIG. 16 showing the closure members in open position.
Figure 19:
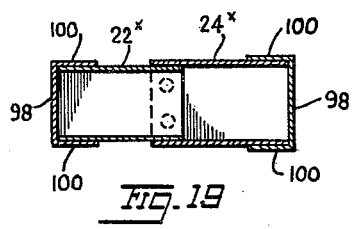
FIG. 19 is a cross-sectional view taken on the line 19—19 of FIG. 18.

The sections are opened by swinging the side walls 98 outwardly as shown in FIG. 17 and may be filled with any desired objects or substance through the open outer sides thereof. The sections are closed by swinging the side walls 98 toward the open outer sides, the wings 100 frictionally engaging the sections and holding the side walls in closed position. The side walls 98 are formed with slight extensions serving as finger pieces 106 for opening and closing the container. The side walls seal the container and keep the contents in fresh condition.

While I have illustrated and described the preferred embodiments of my invention, it is to be understood that I do not limit myself to the precise constructions herein disclosed and that various changes and modifications may be made within the scope of the invention as defined in the appended claim, and the trimming strips may have either a geometrical or a nongeometrical figure.

Having thus described my invention, what I claim as new, and desire to secure by United States Letters Patent is:

A container comprising a sectional tubular body, round in cross section, one section telescopically arranged within the other section, the outer section open at both ends, the inner section closed at both ends for supporting the contents, a rail on the side wall of the outer section extending therealong and adapted to receive a rail on the inner section, said outer rail having a slot therealong, and a pin extending radially of the rail on the inner section through the slot in the outer rail for guiding the movements of the sections, said outer section having an extension on one of its outer ends, said extension externally screw threaded, said outer section having an arcuate slot closely spaced inwardly of the threaded extension, and a flanged nut threaded on the extension for restricting the open in the extension on the outer end of the outer section.

References Cited in the file of this patent
UNITED STATES PATENTS

| | | |
|---|---|---|
| 463,256 | Side | Nov. 17, 1891 |
| 475,563 | Howe | May 24, 1892 |
| 525,937 | Bartlett | Sept. 11, 1894 |
| 968,633 | Andrews | Aug. 30, 1910 |
| 1,450,674 | Marston | Apr. 3, 1923 |
| 1,481,325 | Le Gris | Jan. 22, 1924 |
| 1,671,285 | Hanna | May 29, 1928 |
| 1,827,396 | Luckett | Oct. 13, 1931 |
| 1,837,784 | Luckett | Dec. 22, 1931 |
| 1,934,138 | Paul et al. | Nov. 7, 1933 |
| 2,083,868 | Rottman | June 15, 1937 |
| 2,244,630 | Metternich | June 3, 1941 |
| 2,289,747 | Baker | July 14, 1942 |
| 2,355,127 | White | Aug. 8, 1944 |
| 2,504,490 | Broder | Apr. 18, 1950 |
| 2,572,960 | Steans | Oct. 30, 1951 |
| 2,623,229 | Brinton | Dec. 30, 1952 |
| 2,698,124 | Hines | Dec. 28, 1954 |
| 2,755,919 | Genshaw et al. | July 24, 1956 |
| 2,763,395 | Meek | Sept. 18, 1956 |
| 2,763,956 | Olson | Sept. 25, 1956 |
| 2,864,494 | Wahle | Dec. 16, 1958 |